(No Model.)

A. W. BERNE.
RAILWAY DANGER SIGNAL.

No. 495,193. Patented Apr. 11, 1893.

Witnesses:—
D. N. Hayward
George Barry.

Inventor:—
Arthur W. Berne
by attorneys
Brown & Seward

UNITED STATES PATENT OFFICE.

ARTHUR W. BERNE, OF NEW YORK, N. Y., ASSIGNOR OF ONE-HALF TO WILLIAM H. WALSH, OF SAME PLACE.

RAILWAY DANGER-SIGNAL.

SPECIFICATION forming part of Letters Patent No. 495,193, dated April 11, 1893.

Application filed August 5, 1892. Serial No. 442,217. (No model.)

*To all whom it may concern:*

Be it known that I, ARTHUR W. BERNE, of New York, in the county and State of New York, have invented a new and useful Improvement in Railway Danger-Signals, of which the following is a specification.

My invention relates to an improvement in railway danger signals in which a signal on a locomotive is in electric connection with conductors along the track and said conductors are so connected with the switch rails, draw bridge or the circuit on another locomotive that when the locomotive comes upon a block upon which a switch or bridge is open or another locomotive located such information will be forthwith communicated to the engineer and warn him to slow down or stop to avoid accident.

Figure 1:
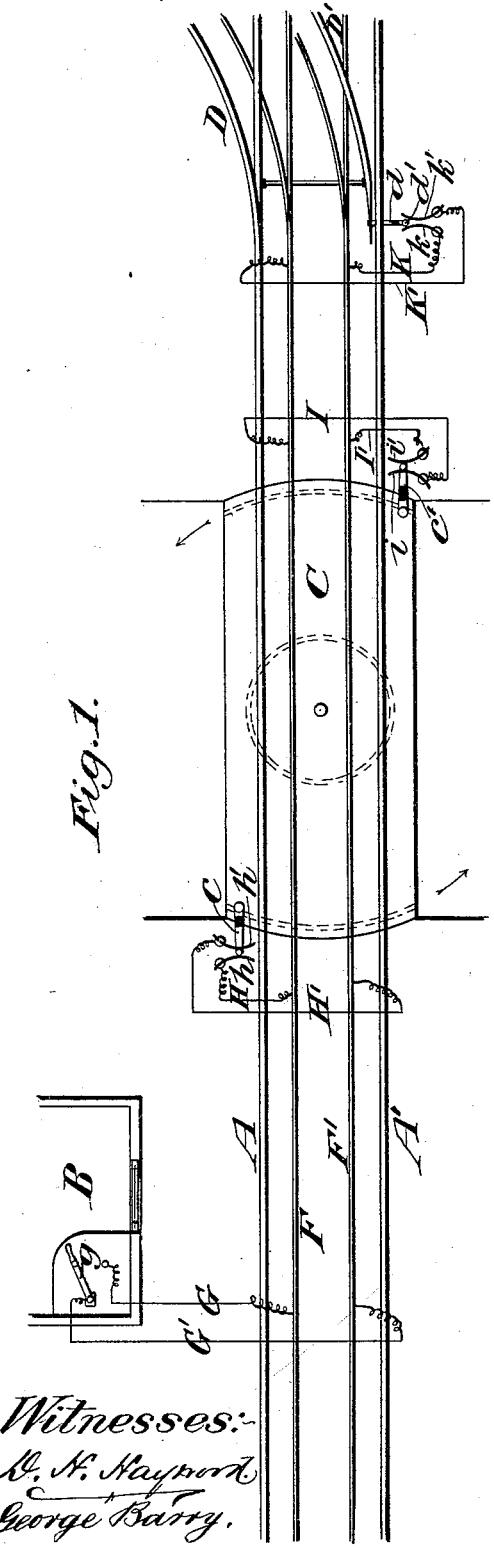
Figure 2:

A practical embodiment of my invention is represented in the accompanying drawings in which, Figures 1 and 2 represent parts of a single track, it being understood that the right hand end of Fig. 2 may, for purposes of illustration, be considered as adjacent to the left hand end of Fig. 1, the two forming a continuous section of track, and showing in connection therewith a signal tower, a draw bridge, a switch track and two locomotives.

The rails of the track are represented by A, A', the tower by B, the draw bridge by C, the rails of the switch track by D, D' and the locomotives by E, E'. Along the track rails there are located electric conductors F, F', said conductors being insulated from the ground and from surrounding objects. The said conductors F, F' are connected by branch wires G, G' with the posts of a circuit closer $g$ at the tower B, so that whenever it is desired the operator in the tower B may by closing the circuit closer $g$ establish electric communication between the conductors F, F'.

The draw bridge is provided at its opposite ends with arms $c$, $c'$ which, when the bridge is closed, are adapted to separate two pairs of circuit closing jaws. The one set of circuit closing jaws is represented by $h$, $h'$—the former in electric communication with the conductor F through a branch wire H and the latter in electric communication with the conductor F' through a branch wire H'; the other pair of circuit closing jaws is represented by $i$ and $i'$, the former connected with the conductor F by a branch wire I and the latter connected with the conductor F' by a branch wire I'. The members of each pair of jaws $h$, $h'$ and $i$, $i'$ are constructed to normally rest in contact and establish an electric circuit between the conductors F and F'. The arms $c$, $c'$ or such portion of said arms as is adapted to enter between the pairs of circuit closing jaws, are of some suitable insulating material so that when the bridge is closed and the track in condition for the passage of the train, there will be no electric communication between the conductors F, F' because said jaws will then be held apart by the insulating pieces between them. When, however, the bridge is swung open, the insulating pieces will be carried by it out from between the circuit closing jaws and the latter will spring together and so complete the electric connection between the conductors F, F' at the track adjacent to the opposite ends of the bridge.

The switch rail D' has fixed thereto an arm $d$ carrying an electric conducting piece $d'$. The piece $d'$ is insulated from surrounding objects and is located in such position relatively to a pair of circuit closing jaws $k$, $k'$, that when the switch rail D' is moved in position to open the main track and direct the train onto the switch track, it will move the conducting piece $d'$ between the circuit closing pieces $k$, $k'$ and into contact therewith so as to establish electric communication between the conductors F, F' through branch wires K and K'.

Each locomotive is provided with a signal adapted to be operated by an electric current. In the present instance an electric bell L is indicated, and said signal is in circuit with a battery M, also carried by the locomotive, and through said battery with a brush N' so located as to move along the conductor F' in electric contact therewith. The other pole of the signal L is connected by means of a wire $l$ with a brush N, adapted to move along the conductor F and in electric contact therewith.

From the above construction and arrangement of parts it follows: That when the operator in the tower B desires to notify an approaching engineer of danger or for other reason wishes to bring the train to a stop, he simply closes the circuit closer $g$, which brings the conductors F and F′ into electric communication and therefore as soon as the locomotive E comes upon the block, the circuit will be complete through the brushes N, N′, the battery M and the signal L and the engineer will be notified to stop. The signal will continue to sound so long as the circuit is left complete and whenever the operator in the tower desires the train to move on, he may simply break the circuit by opening the circuit $g$, when the signal in the engine will stop.

If, from any cause, the bridge C be thrown open, there will be electric communication established between the conductors F and F′ by the withdrawal of the insulating pieces carried by the arms $c, c'$ and whenever the locomotive approaches the bridge from either direction, the signal therein will be sounded in the same manner as above described as soon as the locomotive enters upon the block in which the bridge is located. In the same manner, when the switch is turned to shunt a train from the main to the side track, it will positively close communication between the conductors F and F′ and a warning will be given to the engineer as above described. If, finally, two locomotives enter upon the same block at the same time, there will be electric communication established between the signals in each of them and each will be, at the same moment, notified of danger and warned to slow down or stop.

What I claim is—

In combination, a railway track, a swinging bridge forming a support for the rails of a portion of the track, contact pieces having a normal tendency to rest in electrical contact, insulated conductors located along the track and connected, the one with one of the contact pieces and the other with the other contact piece, an insulating piece carried by the bridge and adapted to separate the contact pieces when the bridge is closed and permit them to close when the bridge is open, and a partial electric circuit carried by a motor and including a battery and a signal, said partial circuit being in constant electrical contact with the insulated conductors, substantially as set forth.

ARTHUR W. BERNE.

Witnesses:
FREDK. HAYNES,
I. B. DECKER.